(12) United States Patent
Hu et al.

(10) Patent No.: US 10,454,880 B2
(45) Date of Patent: Oct. 22, 2019

(54) IP PACKET PROCESSING METHOD AND APPARATUS, AND NETWORK SYSTEM

(71) Applicant: Huawei Technologies Co., Ltd., Shenzhen, Guangdong (CN)

(72) Inventors: Yinliang Hu, Nanjing (CN); Guang Chen, Nanjing (CN); Jian Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 895 days.

(21) Appl. No.: 14/721,839

(22) Filed: May 26, 2015

(65) Prior Publication Data

US 2015/0288651 A1 Oct. 8, 2015

Related U.S. Application Data

(63) Continuation of application No. PCT/CN2013/087051, filed on Nov. 13, 2013.

(30) Foreign Application Priority Data

Nov. 26, 2012 (CN) .......................... 2012 1 0486610

(51) Int. Cl.
*G06F 15/16* (2006.01)
*H04L 29/12* (2006.01)
(Continued)

(52) U.S. Cl.
CPC ...... *H04L 61/2007* (2013.01); *H04L 12/4625* (2013.01); *H04L 47/2441* (2013.01);
(Continued)

(58) Field of Classification Search
CPC ............ H04L 61/2007; H04L 47/2441; H04L 12/4625
(Continued)

(56) References Cited

U.S. PATENT DOCUMENTS 9,722,871 B2 * 8/2017 Miller ................. H04L 41/0816
2004/0071149 A1 4/2004 Kim et al.
(Continued)

FOREIGN PATENT DOCUMENTS

CN 1301611 C 2/2007
CN 101119273 A 2/2008
(Continued)

*Primary Examiner* — Karen C Tang
(74) *Attorney, Agent, or Firm* — Leydig, Voit & Mayer, Ltd.

(57) ABSTRACT

Embodiments of the present invention provide an IP packet processing method and apparatus, and a network system. The method includes: allocating, by an operator service gateway, an IP address to a first intranet of an enterprise; and processing, by the operator service gateway according to the IP address, an interactive service packet between the first intranet and a second intranet of the enterprise. In the technical solutions of the present invention, an operator service gateway allocates an IP address to a first intranet of an enterprise, and the operator service gateway processes, according to the IP address, an interactive service packet between the first intranet and a second intranet of the enterprise, thereby reducing deployment complexity of an enterprise internal network, reducing difficulties and costs in management and maintenance of the enterprise internal network, and reducing investment costs for updating hardware devices in the enterprise internal network.

4 Claims, 11 Drawing Sheets

(51) Int. Cl.
  *H04L 12/851*  (2013.01)
  *H04L 12/46*  (2006.01)
  *H04L 29/08*  (2006.01)
  *H04L 29/06*  (2006.01)
  *G06F 15/173*  (2006.01)

(52) U.S. Cl.
  CPC .......... *H04L 63/0272* (2013.01); *H04L 67/10* (2013.01); *H04L 63/164* (2013.01)

(58) Field of Classification Search
  USPC ................................................ 709/217, 219
  See application file for complete search history.

(56) References Cited

U.S. PATENT DOCUMENTS

| | | | |
|---|---|---|---|
| 2004/0218611 A1 | 11/2004 | Kim | |
| 2005/0066035 A1 | 3/2005 | Williams et al. | |
| 2005/0111455 A1 | 5/2005 | Nozue et al. | |
| 2005/0232273 A1 | 10/2005 | Suzuki | |
| 2007/0008924 A1* | 1/2007 | Moran | H04L 12/4641 370/331 |
| 2007/0058644 A1* | 3/2007 | Brahmbhatt | H04L 29/12 370/401 |
| 2007/0140159 A1* | 6/2007 | Eronen | H04L 12/12 370/328 |
| 2008/0002727 A1* | 1/2008 | Yamane | H04L 12/1836 370/401 |
| 2009/0287848 A1* | 11/2009 | Kamura | H04L 12/4641 709/246 |
| 2009/0303883 A1* | 12/2009 | Kucharczyk | H04L 12/4645 370/241 |
| 2010/0062791 A1* | 3/2010 | Wang | H04W 12/12 455/456.1 |
| 2012/0144188 A1* | 6/2012 | Agostani | H04L 63/0272 713/153 |
| 2012/0204241 A1* | 8/2012 | Varsavsky Waisman-Diamond | H04L 29/12367 726/5 |
| 2012/0275328 A1* | 11/2012 | Iwata | H04L 69/324 370/252 |
| 2013/0097329 A1* | 4/2013 | Alex | H04L 61/1511 709/228 |
| 2013/0097418 A1* | 4/2013 | Bhatt | H04L 63/0892 713/151 |
| 2013/0097674 A1* | 4/2013 | Jindal | H04L 63/0876 726/4 |
| 2013/0232251 A1* | 9/2013 | Pauley | H04L 63/306 709/224 |
| 2014/0010206 A1* | 1/2014 | Bi | H04W 76/22 370/331 |
| 2014/0092899 A1* | 4/2014 | Krishna | H04L 61/2517 370/389 |
| 2014/0211714 A1* | 7/2014 | Li | H04L 41/5041 370/329 |
| 2014/0269740 A1* | 9/2014 | Garneij | H04W 8/26 370/401 |
| 2015/0229601 A1* | 8/2015 | Frey | H04L 41/0869 709/221 |
| 2017/0223117 A1* | 8/2017 | Messerli | G06F 9/5072 |
| 2017/0346689 A1* | 11/2017 | Miller | H04L 41/0816 |

FOREIGN PATENT DOCUMENTS

| | | |
|---|---|---|
| CN | 101325759 A | 12/2008 |
| CN | 101442565 A | 5/2009 |
| CN | 101499965 A | 8/2009 |
| CN | 101534329 A | 9/2009 |
| CN | 102055816 A | 5/2011 |
| CN | 102217245 A | 10/2011 |
| EP | 1 441 483 A2 | 7/2004 |
| EP | 2 482 502 A2 | 8/2012 |
| JP | 2001-136198 A | 5/2001 |
| JP | 2003-152768 A | 5/2003 |
| JP | 2004-153366 A | 5/2004 |
| JP | 2004-229299 A | 8/2004 |
| JP | 2006-20085 A | 1/2006 |
| JP | 2006-129090 A | 5/2006 |
| KR | 20040035902 A | 4/2004 |
| WO | WO 2008/045616 A1 | 4/2008 |

* cited by examiner

US 10,454,880 B2

IP PACKET PROCESSING METHOD AND APPARATUS, AND NETWORK SYSTEM

CROSS-REFERENCE TO RELATED APPLICATIONS

This application is a continuation of International Application No. PCT/CN2013/087051, filed on Nov. 13, 2013, which claims priority to Chinese Patent Application No. 201210486610.8, filed on Nov. 26, 2012, both of which are hereby incorporated by reference in their entireties.

TECHNICAL FIELD

Embodiments of the present invention relate to communications technologies, and in particular, to an IP packet processing method and apparatus, and a network system.

BACKGROUND

As an enterprise market scale keeps growing, an enterprise has an increasing number of branches and is expanded from a single geographical site to a collaborative office across multiple sites, and network management and policy distribution of the enterprise also become increasingly complex. The geographical site expansion further requires the enterprise to deploy more network services.

When interconnection and interworking need to be implemented between branches and a headquarters, and among branches in an enterprise, interconnection and interworking are generally implemented for small and medium enterprises by using an Internet Protocol Security Virtual Private Network (IPSec VPN) due to a high price of a private line service.

An existing enterprise internal network has a problem of complex deployment, which further leads to a problem of more difficult and expensive management and maintenance of the enterprise internal network, and higher investment costs for updating hardware devices in the enterprise internal network.

SUMMARY

Embodiments of the present invention provide an IP packet processing method and apparatus, and a network system, which are used to reduce deployment complexity of an enterprise internal network, reduce difficulties and costs in management and maintenance of the enterprise internal network, and reduce investment costs for updating hardware devices in the enterprise internal network.

According to a first aspect, an embodiment of the present invention provides an IP packet processing method, including:

allocating, by an operator service gateway, an IP address to a first intranet of an enterprise; and processing, by the operator service gateway according to the IP address, an interactive service packet between the first intranet and a second intranet of the enterprise.

In a first possible implementation manner of the first aspect, the allocating, by an operator service gateway, an IP address to a first intranet of an enterprise includes:

allocating, by the operator service gateway, a public IP address to the first intranet; and performing, by using the public IP address, IP Security IPSec negotiation with an operator service gateway corresponding to the second intranet or a router corresponding to the second intranet; and allocating, by the operator service gateway, an internal IP address to a user equipment in the first intranet, where a correspondence exists between the internal IP address and the public IP address.

In a second implementation manner according to the first implementation manner of the first aspect, the allocating, by the operator service gateway, an internal IP address to a user equipment in the first intranet includes:

receiving, by the operator service gateway, an internal address request message that is sent by the user equipment and forwarded by an operator access device; and sending, by the operator service gateway, an internal address response message that includes the internal IP address to the operator access device, so that the operator access device sends the internal IP address to the user equipment.

In a third possible implementation manner according to the first or second possible implementation manner of the first aspect, the processing, by the operator service gateway according to the IP address, an interactive service packet between the first intranet and a second intranet of the enterprise includes:

receiving, by the operator service gateway, a first service packet that is sent by the user equipment and forwarded by the operator access device, where the first service packet includes the internal IP address;

performing, by the operator service gateway, IPSec encapsulation on the first service packet, where the first service packet that is IPSec-encapsulated includes the public IP address; and sending, by the operator service gateway, the first service packet that is IPSec-encapsulated to the operator service gateway corresponding to the second intranet or the router corresponding to the second intranet.

In a fourth possible implementation manner according to the third possible implementation manner of the first aspect, after sending the first service packet that is IPSec-encapsulated to the operator service gateway corresponding to the second intranet or the router corresponding to the second intranet, the method further includes:

receiving, by the operator service gateway, a second service packet that includes a public IP address of the second intranet and is sent by the operator service gateway corresponding to the second intranet or the router corresponding to the second intranet;

performing, by the operator service gateway, IPSec decapsulation on the second service packet; and sending, by the operator service gateway, the second service packet that is IPSec-decapsulated to the operator access device, so that the operator access device sends the second service packet to the user equipment in the first intranet.

In a fifth possible implementation manner according to the second possible implementation manner of the first aspect, the internal address request message and the internal address response message include a virtual local area network VLAN identifier, where the VLAN identifier corresponds to the first intranet.

According to a second aspect, an embodiment of the present invention provides an IP packet processing method, including:

receiving, by an operator access device, an internal address request message sent by a user equipment in a first intranet of an enterprise; and sending, by the operator access device, the internal address request message to an operator service gateway, so that the operator service gateway allocates an internal IP address to the user equipment.

In a first possible implementation manner of the second aspect, after the sending, by the operator access device, the internal address request message to an operator service gateway, the method further includes:

receiving, by the operator access device, an internal address response message that includes the internal IP address and is sent by the operator service gateway; and sending, by the operator access device, the internal address response message to the user equipment.

In a second possible implementation manner according to the first possible implementation manner of the second aspect, before the sending, by the operator access device, the internal address request message to an operator service gateway, the method further includes:

adding, by the operator access device, a VLAN identifier to the internal address request message, where the VLAN identifier corresponds to the first intranet; and the sending, by the operator access device, the internal address response message to the user equipment includes:

deleting, by the operator access device, the VLAN identifier included in the internal address response message, and sending the internal address response message to the user equipment in the first intranet corresponding to the VLAN identifier.

According to a third aspect, an embodiment of the present invention provides an operator service gateway, including:

an allocating module, configured to allocate an IP address to a first intranet of an enterprise; and a processing module, configured to process, according to the IP address, an interactive service packet between the first intranet and a second intranet of the enterprise.

In a first possible implementation manner of the third aspect, the allocating module is specifically configured to:

allocate a public IP address to the first intranet and perform, by using the public IP address, IP Security IPSec negotiation with an operator service gateway corresponding to the second intranet or a router corresponding to the second intranet; and allocate an internal IP address to a user equipment in the first intranet, where a correspondence exists between the internal IP address and the public IP address.

In a second possible implementation manner according to the first possible implementation manner of the third aspect, the allocating module is further configured to:

receive an internal address request message that is sent by the user equipment and forwarded by an operator access device; and send an internal address response message that includes the internal IP address to the operator access device, so that the operator access device sends the internal IP address to the user equipment.

In a third possible implementation manner according to the first or second possible implementation manner of the third aspect, the processing module is specifically configured to:

receive a first service packet that is sent by the user equipment and forwarded by the operator access device, where the first service packet includes the internal IP address;

perform IPSec encapsulation on the first service packet, where the first service packet that is IPSec-encapsulated includes the public IP address; and send the first service packet that is IPSec-encapsulated to the operator service gateway corresponding to the second intranet or the router corresponding to the second intranet.

In a fourth possible implementation manner according to the third possible implementation manner of the third aspect, the processing module is further configured to:

after the first service packet that is IPSec-encapsulated is sent to the operator service gateway corresponding to the second intranet or the router corresponding to the second intranet, receive a second service packet that includes a public IP address of the second intranet and is sent by the operator service gateway corresponding to the second intranet or the router corresponding to the second intranet;

perform IPSec decapsulation on the second service packet; and send the second service packet that is IPSec-decapsulated to the operator access device, so that the operator access device sends the second service packet to the user equipment in the first intranet.

In a fifth possible implementation manner according to the second possible implementation manner of the first aspect, the internal address request message and the internal address response message include a virtual local area network VLAN identifier, where the VLAN identifier corresponds to the first intranet.

In a fourth aspect, an embodiment of the present invention provides an operator access device, including:

a receiving module, configured to receive an internal address request message sent by a user equipment in a first intranet of an enterprise; and a sending module, configured to send the internal address request message to an operator service gateway, so that the operator service gateway allocates an internal IP address to the user equipment.

In a first possible implementation manner of the fourth aspect, the receiving module is further configured to: after the internal address request message is sent to the operator service gateway, receive an internal address response message that includes the internal IP address and is sent by the operator service gateway; and the sending module is further configured to send the internal address response message to the user equipment.

In a second possible embodiment according to the first possible implementation manner of the fourth aspect, the operator access device further includes:

a processing module, configured to: before the internal address request message is sent to the operator service gateway, add a VLAN identifier to the internal address request message, where the VLAN identifier corresponds to the first intranet;

the processing module is further configured to delete the VLAN identifier included in the internal address response message; and the sending module is specifically configured to send the internal address response message to the user equipment in the first intranet corresponding to the VLAN identifier.

In a fifth aspect, an embodiment of the present invention provides a network system, including the operator service gateway in the third aspect or any possible implementation manner of the third aspect and the operator access device in the fourth aspect or any possible implementation manner of the fourth aspect.

According to the IP packet processing method and apparatus, and the network system provided by the embodiments of the present invention, an operator service gateway allocates an IP address to a first intranet of an enterprise, and the operator service gateway processes, according to the IP address, an interactive service packet between the first intranet and a second intranet of the enterprise, thereby reducing deployment complexity of an enterprise internal network, reducing difficulties and costs in management and maintenance of the enterprise internal network, and reducing investment costs for updating hardware devices in the enterprise internal network.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

FIG. 11C-1 and FIG. 11C-2 are a flowchart of implementing, by the network system shown in FIG. 11A, a packet sending and receiving phase in the embodiment of the IP packet processing method according to the present invention.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
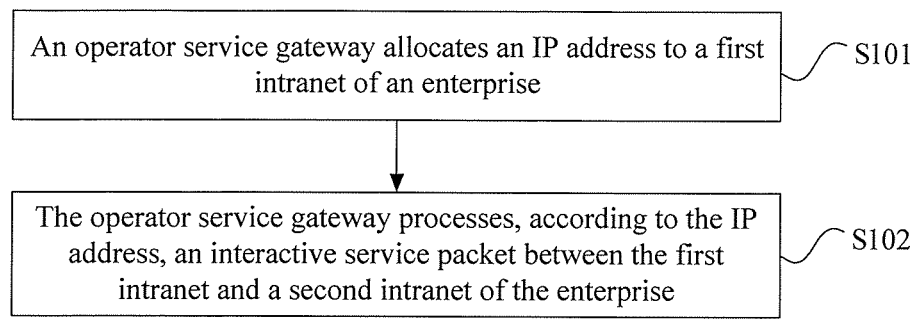
FIG. 1 is a flowchart of Embodiment 1 of an IP packet processing method according to the present invention.

FIG. 1 is a flowchart of Embodiment 1 of an IP packet processing method according to the present invention. As shown in FIG. 1, the IP packet processing method according to this embodiment includes the following:

S101: An operator service gateway allocates an IP address to a first intranet of an enterprise.

Specifically, the first intranet of the enterprise may be an internal network of a headquarters of the enterprise or an internal network of a branch of the enterprise. When interconnection and interworking between a branch and the headquarters, and among branches of the enterprise are implemented by using an IPSec VPN, the first intranet needs to obtain an IP address that may be used to connect to a public network; and a user equipment in the first intranet needs to obtain an internal IP address that may be used to interwork with a user equipment in another intranet. In this embodiment, the operator service gateway may allocate a public IP address to the first intranet and allocate an internal IP address to the user equipment in the first intranet, and a correspondence exists between the allocated internal IP address and the foregoing allocated public IP address.

For example, the foregoing operator service gateway may be an operator broadband network gateway (Broadband Network Gateway, BNG for short).

In the prior art, a manner of obtaining a public IP address by the first intranet is that: An access router disposed in the first intranet requests, by dialing, a public IP address from the operator service gateway; the operator service gateway authenticates the request, and then returns a public IP address to the access router in the first intranet. However, in this embodiment of the present invention, the operator service gateway allocates a public IP address to the first intranet upon registration in the first intranet. Therefore, in this embodiment of the present invention, a network in the first intranet may be simplified. For example, the access router may not need to be disposed, or a function of the access router or a similar device in the first intranet may be simplified.

S102: The operator service gateway processes, according to the IP address, an interactive service packet between the first intranet and a second intranet of the enterprise.

That the user equipment in the first intranet interacts with a user equipment in the second intranet of the enterprise is used as an example. The operator service gateway may process an interactive IP packet between the user equipment in the first intranet and the user equipment in the second intranet according to the public IP address and the internal IP address respectively allocated to the first intranet of the enterprise and the user equipment in the first intranet of the enterprise, and according to a public IP address and an internal IP address respectively allocated to the second intranet of the enterprise and the user equipment in the second intranet of the enterprise, so as to implement information transmission between the user equipment in the first intranet and the user equipment in the second intranet.

In the prior art, an operation that the first intranet and the second intranet separately use a public IP address to perform IPSec negotiation and send a packet to an IPSec tunnel is implemented between the access router disposed in the first intranet and an access router disposed in the second intranet. In this embodiment of the present invention, an operation that the first intranet and the second intranet separately use a public IP address to perform IPSec negotiation and send a packet to an IPSec tunnel for sending may be implemented between an operator service gateway corresponding to the first intranet and an access router disposed in the second intranet, or may be implemented between the operator service gateway corresponding to the first intranet and an operator service gateway corresponding to the second intranet.

The operator service gateway allocates the IP address to the first intranet and processes, according to the IP address, the interactive service packet between the first intranet and the second intranet of the enterprise, so as to reduce deployment complexity of the enterprise internal network, thereby reducing difficulties and costs in management and maintenance of the enterprise internal network. Further, if the enterprise needs to upgrade the internal network due to an increase in service requirements or an increase in network traffic, only software of the operator service gateway that is used to execute the IP packet processing method in this embodiment needs to be updated to implement the upgrade, so as to reduce replacement of hardware devices in the enterprise internal network in the prior art, thereby reducing investment costs for updating the hardware devices in the enterprise internal network.

In the IP packet processing method according to this embodiment, an operator service gateway allocates an IP address to a first intranet of an enterprise, and the operator service gateway processes an interactive service packet between the first intranet and a second intranet of the enterprise, thereby reducing deployment complexity of an enterprise internal network, reducing difficulties and costs in management and maintenance of the enterprise internal network, and reducing investment costs for updating hardware devices in the enterprise internal network.

Figure 2:
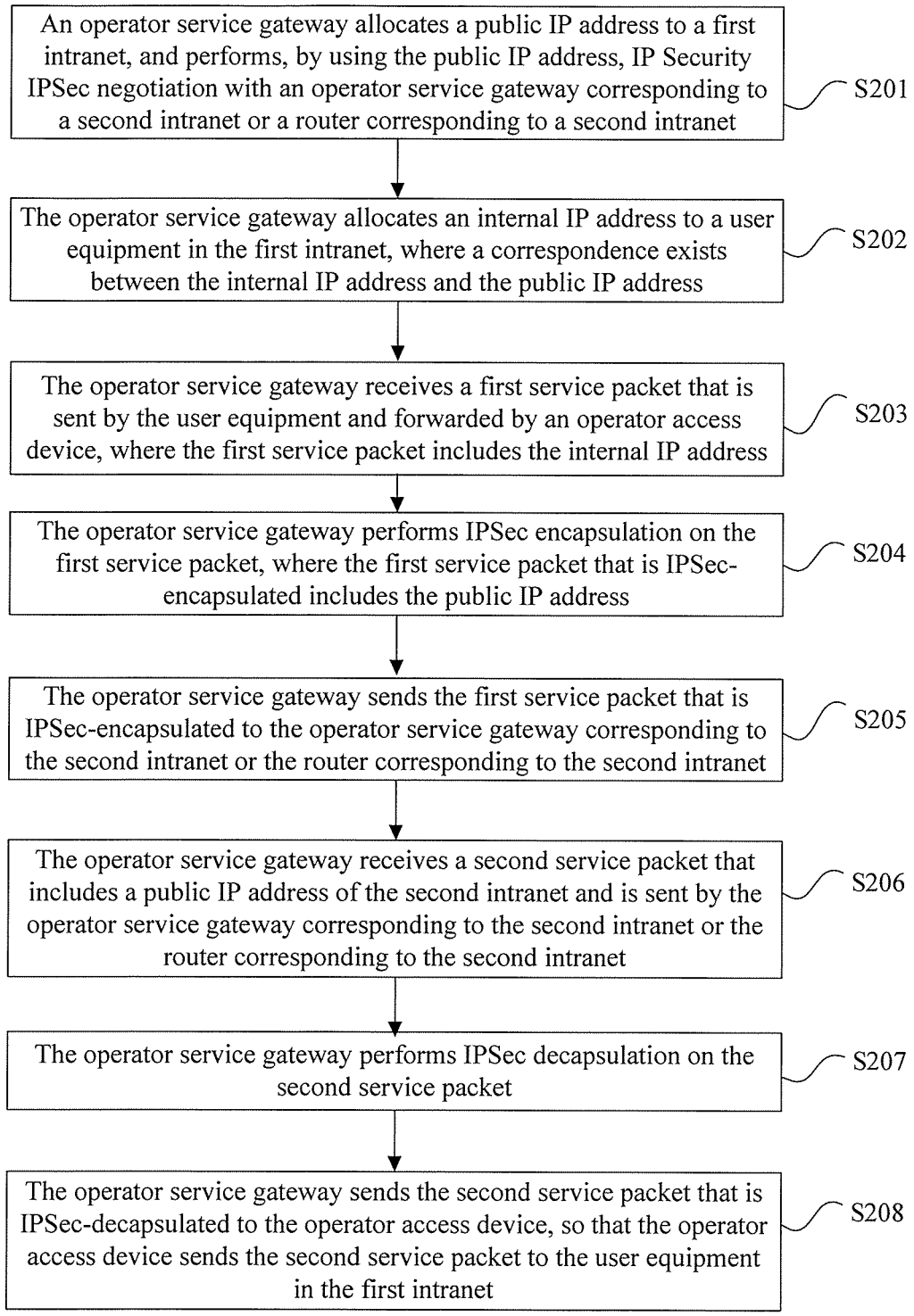
FIG. 2 is a flowchart of Embodiment 2 of an IP packet processing method according to the present invention.

FIG. 2 is a flowchart of Embodiment 2 of an IP packet processing method according to the present invention. As shown in FIG. 2, the IP packet processing method according to this embodiment includes the following:

S201: An operator service gateway allocates a public IP address to a first intranet, and performs, by using the public IP address, IP Security IPSec negotiation with an operator service gateway corresponding to a second intranet or a router corresponding to a second intranet.

Specifically, the public IP address allocated to the first intranet by the operator service gateway may be a static or dynamic public IP address. If an access router is disposed in the second intranet, the operator service gateway performs IPSec negotiation with the access router in the second intranet by using the public IP address allocated to the first intranet. If no access router is disposed in the second intranet, the operator service gateway performs, by using the public IP address allocated to the first intranet, IPSec negotiation with an operator service gateway corresponding to the second intranet.

An IPSec negotiation result may include information such as an authentication protocol required for transmitting information, and an encryption key required by a security mechanism.

S202: The operator service gateway allocates an internal IP address to a user equipment in the first intranet, where a correspondence exists between the internal IP address and the public IP address.

Specifically, if the user equipment in the first intranet needs to interact with a user equipment in another intranet, an internal IP address needs to be obtained.

The user equipment in this embodiment may be any device possibly used in an enterprise network, for example, a personal computer (personal computer, PC for short), which is not limited in this embodiment.

Further, step S202 may include:

receiving, by the operator service gateway, an internal address request message that is sent by the user equipment and forwarded by an operator access device.

When the user equipment in the first intranet needs to obtain an internal IP address, the user equipment in the first intranet sends an internal address request message to the operator access device. After receiving the foregoing internal address request message, the operator access device forwards the internal address request message to the operator service gateway.

It can be understood that, if the operator service gateway serves multiple enterprise intranets, after receiving the foregoing internal address request message, the operator access device needs to add a virtual local area network (Virtual Local Area Network, VLAN for short) identifier to the internal address request message according to an ingress port number, where the VLAN identifier corresponds to the first intranet.

The operator service gateway sends an internal address response message that includes the internal IP address to the operator access device, so that the operator access device sends the internal IP address to the user equipment.

After receiving the internal address request message, the operator service gateway sends the internal address response message that includes the internal IP address to the operator access device, so that the operator access device sends the internal IP address to the user equipment.

S203: The operator service gateway receives a first service packet that is sent by the user equipment and forwarded by the operator access device, where the first service packet includes the internal IP address.

That the user equipment in the first intranet of the enterprise interacts with a user equipment in the second intranet of the enterprise is used as an example. The user equipment in the first intranet generates the first service packet according to service information and the internal IP address, and an internal IP address of the user equipment in the peer-end second intranet; and sends the first service packet to the operator access device. Similarly, if the operator service gateway serves multiple enterprise intranets, after receiving the foregoing internal address request message, the operator access device needs to add a VLAN identifier to the first service packet according to the ingress port number, where the VLAN identifier corresponds to the first intranet. The operator service gateway receives the first service packet into which the VLAN identifier is added and which is forwarded by the operator access gateway.

S204: The operator service gateway performs IPSec encapsulation on the first service packet, where the first service packet that is IPSec-encapsulated includes the public IP address.

Specifically, if the first service packet received by the operator service gateway includes a VLAN identifier, the VLAN identifier needs to be removed before IPSec encapsulation is performed on the first service packet. The first service packet that is IPSec-encapsulated includes the public IP address of the first intranet and a public IP address of the peer-end second intranet.

S205: The operator service gateway sends the first service packet that is IPSec-encapsulated to the operator service gateway corresponding to the second intranet or the router corresponding to the second intranet.

If an access router is disposed in the second intranet, the service operator gateway sends the first service packet that is IPSec-encapsulated to the access router in the second intranet. If no access router is disposed in the second intranet, the service gateway sends the first service packet that is IPSec-encapsulated to the operator service gateway corresponding to the second intranet.

S206: The operator service gateway receives a second service packet that includes the public IP address of the second intranet and is sent by the operator service gateway corresponding to the second intranet or the router corresponding to the second intranet.

After receiving the foregoing first service packet that is IPSec-encapsulated, the operator service gateway corresponding to the second intranet or the router corresponding to the second intranet performs IPSec decapsulation on the first service packet, and sends the first service packet that is IPSec-decapsulated to the user equipment in the second intranet, so that the user equipment in the second intranet generates the second service packet according to feedback service information for the first service packet, the internal IP address of the user equipment in the second intranet, and the internal IP address of the user equipment in the first intranet, and sends the second service packet to the operator service gateway corresponding to the second intranet or the router corresponding to the second intranet. The operator service gateway corresponding to the second intranet or the router corresponding to the second intranet performs IPSec encapsulation on the received second service packet.

S207: The operator service gateway performs IPSec decapsulation on the second service packet.

S208: The operator service gateway sends the second service packet that is IPSec-decapsulated to the operator access device, so that the operator access device sends the second service packet to the user equipment in the first intranet.

Further, in this embodiment, the internal address request message and the internal address response message may include the virtual local area network VLAN identifier, where the VLAN identifier corresponds to the first intranet.

In the IP packet processing method according to this embodiment, an operator service gateway allocates a public IP address and an internal IP address to a first intranet of an enterprise and a user equipment in the first intranet of the enterprise, respectively; and the operator service gateway performs, according to the public IP address and the public internal IP address, IPSec encapsulation on a first service packet sent by the user equipment in the first intranet, and sends the first service packet that is IPSec-encapsulated to an operator service gateway corresponding to a second intranet or a router corresponding to a second intranet through a public network, and then sends the second service packet that is IPSec-decapsulated to an operator access device, so that the operator access device sends the second service packet to the user equipment in the first intranet, thereby reducing deployment complexity of an enterprise internal network, reducing difficulties and costs in management and maintenance of the enterprise internal network, and reducing investment costs for updating hardware devices in the enterprise internal network.

Figure 3:
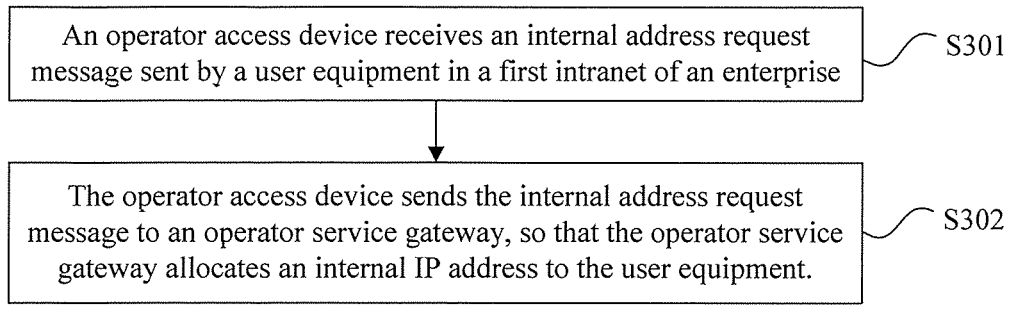
FIG. 3 is a flowchart of Embodiment 3 of an IP packet processing method according to the present invention.

FIG. 3 is a flowchart of Embodiment 3 of an IP packet processing method according to the present invention. As shown in FIG. 3, the IP packet processing method according to this embodiment includes the following:

S301: An operator access device receives an internal address request message sent by a user equipment in a first intranet of an enterprise.

When needing to obtain an internal IP address, the user equipment in the first intranet sends an internal address request message to the operator access device. After receiving the foregoing internal address request message, the operator access device forwards the internal address request message to an operator service gateway.

It can be understood that, if the operator service gateway serves multiple enterprise intranets, after receiving the foregoing internal address request message, the operator access device needs to add a VLAN identifier to the internal address request message according to an ingress port number, where the VLAN identifier corresponds to the first intranet.

S302: The operator access device sends the internal address request message to the operator service gateway, so that the operator service gateway allocates an internal IP address to the user equipment.

In the prior art, a user equipment in a first intranet obtains an internal IP address by means of interaction with an access router disposed in the first intranet. However, in the IP packet processing method according to this embodiment of the present invention, the operator access device forwards the internal address request message to the operator service gateway and forwards the internal IP address allocated to the user equipment by the operator service gateway to the user equipment, so that the user equipment is allocated the internal IP address.

In the IP packet processing method according to this embodiment, an operator access device receives an internal address request message sent by a user equipment in a first intranet of an enterprise, and sends the internal address request message to an operator service gateway, so that the operator service gateway allocates an internal IP address to the user equipment, thereby reducing deployment complexity of an enterprise internal network, reducing difficulties and costs in management and maintenance of the enterprise internal network, and reducing investment costs for updating hardware devices in the enterprise internal network.

Figure 4:
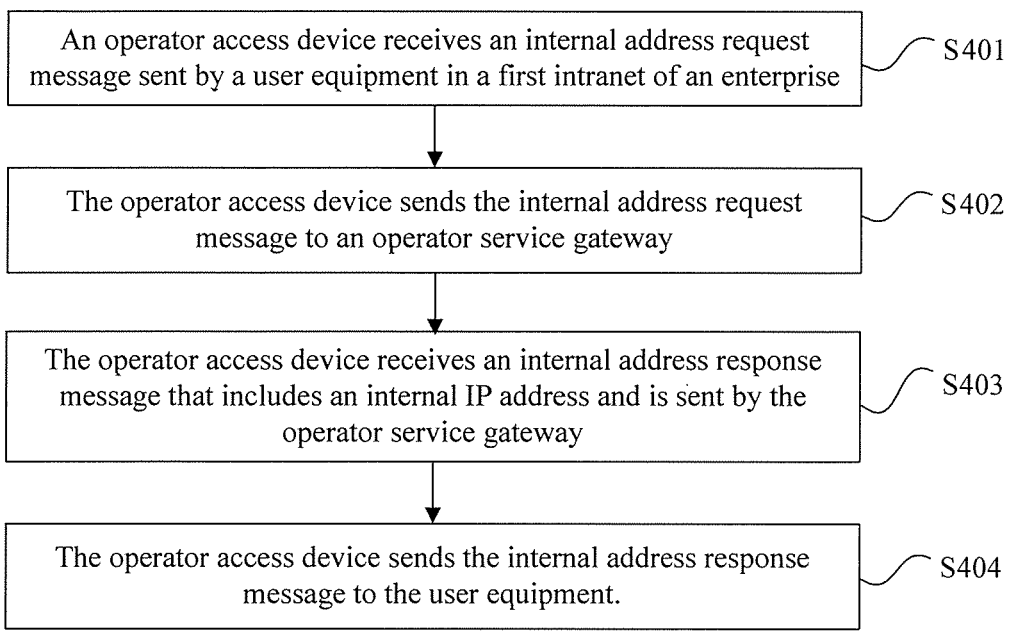
FIG. 4 is a flowchart of Embodiment 4 of an IP packet processing method according to the present invention.

FIG. 4 is a flowchart of Embodiment 4 of an IP packet processing method according to the present invention. As shown in FIG. 4, the IP packet processing method according to this embodiment includes the following:

S401: An operator access device receives an internal address request message sent by a user equipment in a first intranet of an enterprise.

S402: The operator access device sends the internal address request message to an operator service gateway.

S403: The operator access device receives an internal address response message that is sent by the operator service gateway and includes an internal IP address.

The internal address response message sent by the operator service gateway includes an internal IP address allocated to the user equipment in the first intranet.

S404: The operator access device sends the internal address response message to the user equipment.

Further, if the operator service gateway serves multiple enterprise intranets, before the foregoing S402, the method further includes: adding, by the operator access device, a VLAN identifier to the internal address request message, where the VLAN identifier corresponds to the first intranet.

S404 may specifically be that: the operator access device deletes the VLAN identifier included in the internal address response message, and sends the internal address response message to the user equipment in the first intranet corresponding to the VLAN identifier.

In the IP packet processing method according to this embodiment, an operator access device receives an internal address request message sent by a user equipment in a first intranet of an enterprise, and sends the internal address request message to an operator service gateway, so that the operator service gateway allocates an internal IP address to the user equipment, thereby reducing deployment complexity of an enterprise internal network, reducing difficulties and costs in management and maintenance of the enterprise internal network, and reducing investment costs for updating hardware devices in the enterprise internal network.

Figure 5:
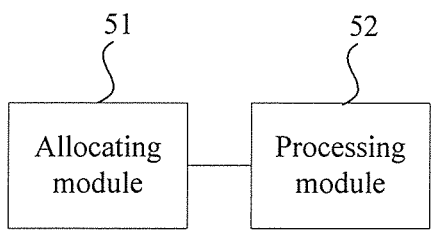
FIG. 5 is a schematic structural diagram of Embodiment 1 of an operator service gateway according to the present invention.

FIG. 5 is a schematic structural diagram of Embodiment 1 of an operator service gateway according to the present invention. As shown in FIG. 5, the operator service gateway according to this embodiment includes an allocating module 51 and a processing module 52, where the allocating module 51 is configured to allocate an IP address to a first intranet of an enterprise, and the processing module is configured to process, according to the IP address, an interactive service packet between the first intranet and a second intranet of the enterprise.

For example, the operator service gateway according to this embodiment may be a BNG.

An apparatus according to this embodiment may be used to execute a technical solution of the method embodiment shown in FIG. 1. Implementation principles and technical effects thereof are similar, and details are not described herein again.

In Embodiment 2 of the operator service gateway according to the present invention, the allocating module 51 is specifically configured to:

allocate a public IP address to the first intranet and perform, by using the public IP address, IP Security IPSec negotiation with an operator service gateway corresponding to the second intranet or a router corresponding to the second intranet; and allocate an internal IP address to a user equipment in the first intranet, where a correspondence exists between the internal IP address and the public IP address.

The allocating module 51 is further configured to:

receive an internal address request message that is sent by the user equipment and forwarded by an operator access device; and send an internal address response message that includes the internal IP address to the operator access device, so that the operator access device sends the internal IP address to the user equipment.

The processing module 52 is specifically configured to:

receive a first service packet that is sent by the user equipment and forwarded by the operator access device, where the first service packet includes the internal IP address;

perform IPSec encapsulation on the first service packet, where the first service packet that is IPSec-encapsulated includes the public IP address; and send the first service packet that is IPSec-encapsulated to the operator service gateway corresponding to the second intranet or the router corresponding to the second intranet.

The processing module 52 is further configured to:

after sending the first service packet that is IPSec-encapsulated to the operator service gateway corresponding to the second intranet or the router corresponding to the second intranet, receive a second service packet that includes a public IP address of the second intranet and is sent by the operator service gateway corresponding to the second intranet or the router corresponding to the second intranet;

perform IPSec decapsulation on the second service packet; and send the second service packet that is IPSec-decapsulated to the operator access device, so that the operator access device sends the second service packet to the user equipment in the first intranet.

Further, the foregoing internal address request message, internal address response message, first service packet before the IPSec encapsulation, and second service packet after the IPSec decapsulation include a virtual local area network VLAN identifier, where the VLAN identifier corresponds to the first intranet.

The apparatus according to this embodiment may be used to execute a technical solution of the method embodiment shown in FIG. 2. Implementation principles and technical effects thereof are similar, and details are not described herein again.

The operator service gateway shown in FIG. 5 may execute all operations or functions of the operator service gateway in the embodiment corresponding to any one of the accompany drawings FIG. 1 to FIG. 4.

Figure 6:
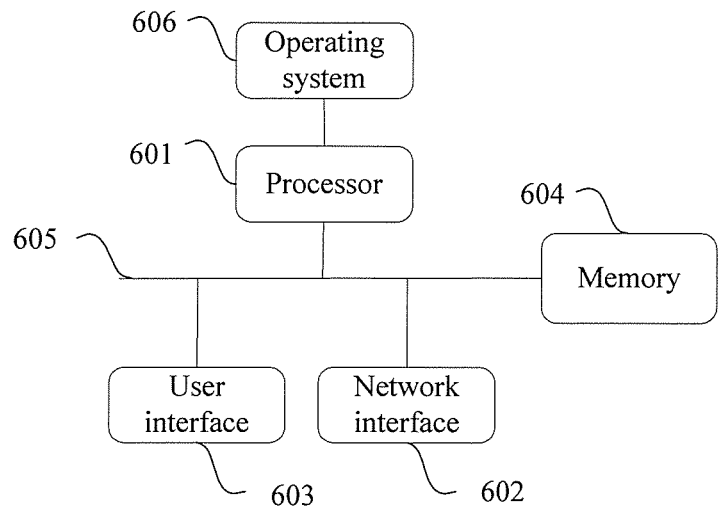
FIG. 6 is a schematic structural diagram of Embodiment 2 of an operator service gateway according to the present invention.

FIG. 6 is a schematic structural diagram of Embodiment 2 of an operator service gateway according to the present invention. As shown in FIG. 6, the operator service gateway in this embodiment includes at least one processor 601, for example, a central processing unit (Central Processing Unit, CPU for short), at least one network interface 602 and another user interface 603, a memory 604, at least one communications bus 605, and an operating system 606. The communication bus 605 is configured to implement connection and communication between these components. The memory 604 may include a high speed RAM memory, or may include a non-volatile memory (non-volatile memory), for example, at least one disk memory. The memory 604 may optionally include at least one storage apparatus located far from the foregoing processor 601. The operating system 606 includes various programs and is configured to implement various basic services and process a hardware-based task.

The processor 601 is configured to allocate an IP address to a first intranet of an enterprise.

The processor 601 is configured to process, according to the IP address, an interactive service packet between the first intranet and a second intranet of the enterprise.

Further, the processor 601 is specifically configured to:

allocate a public IP address to the first intranet and perform, by using the public IP address, IP Security IPSec negotiation with an operator service gateway corresponding to the second intranet or a router corresponding to the second intranet; and allocate an internal IP address to a user equipment in the first intranet, where a correspondence exists between the internal IP address and the public IP address.

Further, the processor 601 is further configured to:

receive an internal address request message that is sent by the user equipment and forwarded by an operator access device; and send an internal address response message that includes the internal IP address to the operator access device, so that the operator access device sends the internal IP address to the user equipment.

Further, the processor 601 is specifically configured to:

receive a first service packet that is sent by the user equipment and forwarded by the operator access device, where the first service packet includes the internal IP address;

perform IPSec encapsulation on the first service packet, where the first service packet that is IPSec-encapsulated includes the public IP address; and send the first service packet that is IPSec-encapsulated to the operator service gateway corresponding to the second intranet or the router corresponding to the second intranet.

Further, the processor 601 is further configured to:

after sending the first service packet that is IPSec-encapsulated to the operator service gateway corresponding to the second intranet or the router corresponding to the second intranet, receive a second service packet that includes a public IP address of the second intranet and is sent by the operator service gateway corresponding to the second intranet or the router corresponding to the second intranet;

perform IPSec decapsulation on the second service packet; and send the second service packet that is IPSec-decapsulated to the operator access device, so that the operator access device sends the second service packet to the user equipment in the first intranet.

For a part or all of the messages involved in this embodiment, generation of the messages may be implemented by the processor 601 of the operator service gateway, or another component/module, or the processor 601 combined with another component/module.

The memory 604 may store a readable computer instruction or computer program. Various operations executed by the at least one processor 601 may be implemented according to the computer instruction or the computer program.

The at least one processor 601 in the operator service gateway in this embodiment may further execute, according to the readable computer instruction or computer program stored in the memory 604, all operations or functions of the operator service gateway in the embodiment corresponding to any one of the accompany drawings FIG. 1 to FIG. 4.

The operator service gateway according to this embodiment may be used to execute a part that is executed by the operator service gateway in the technical solution of the method embodiment shown in FIG. 1 or FIG. 2. Implementation principles and technical effects thereof are similar, and details are not described herein again. FIG. 6 is merely a schematic diagram of a structure of the operator service gateway according to the present invention, and a specific structure may be adjusted according to an actual situation.

Figure 7:
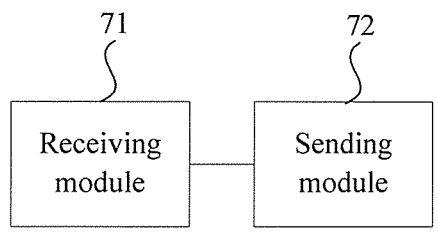
FIG. 7 is a schematic structural diagram of Embodiment 1 of an operator access device according to the present invention.

FIG. 7 is a schematic structural diagram of Embodiment 1 of an operator access device according to the present invention. As shown in FIG. 7, the operator access device in this embodiment includes a receiving module 71 and a sending module 72, where the receiving module 71 is configured to receive an internal address request message sent by a user equipment in a first intranet of an enterprise; the sending module 72 is configured to send the internal address request message to an operator service gateway, so that the operator service gateway allocates an internal IP address to the user equipment.

The apparatus according to this embodiment may be used to execute a technical solution of the method embodiment shown in FIG. 3. Implementation principles and technical effects thereof are similar, and details are not described herein again.

Figure 8:
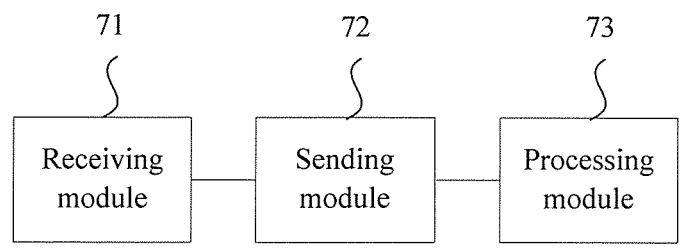
FIG. 8 is a schematic structural diagram of Embodiment 2 of an operator access device according to the present invention.

FIG. 8 is a schematic structural diagram of Embodiment 2 of an operator access device according to the present invention. As shown in FIG. 8, in the operator access device in this embodiment, a receiving module 71 is configured to: after sending an internal address request message to an operator service gateway, receive an internal address response message that includes an internal IP address and is sent by the operator service gateway.

A sending module 72 is configured to send the internal address response message to a user equipment.

The operator access device in this embodiment further includes a processing module 73. The processing module 73 is configured to: before the internal address request message is sent to the operator service gateway, add a VLAN identifier to the internal address request message, where the VLAN identifier corresponds to a first intranet.

The processing module 73 is further configured to delete the VLAN identifier included in the internal address response message.

The sending module 72 is specifically configured to send the internal address response message to the user equipment in the first intranet corresponding to the VLAN identifier.

The apparatus according to this embodiment may be used to execute a technical solution of the method embodiment shown in FIG. 4. Implementation principles and technical effects thereof are similar, and details are not described herein again.

The operator access device shown in FIG. 7 or FIG. 8 may execute all operations or functions of the operator access device in the embodiment corresponding to any one of the accompany drawings FIG. 1 to FIG. 4.

Figure 9:
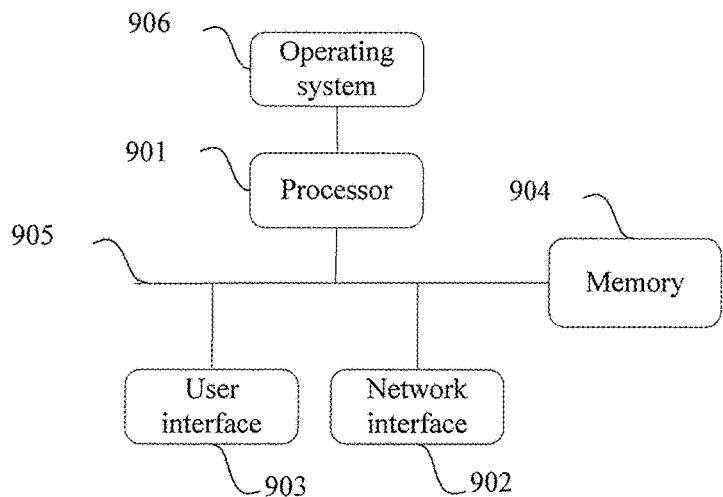
FIG. 9 is a schematic structural diagram of Embodiment 3 of an operator access device according to the present invention.

FIG. 9 is a schematic structural diagram of Embodiment 3 of an operator access device according to the present invention. As shown in FIG. 9, the operator access device in this embodiment includes at least one processor 901, for example, a CPU, at least one network interface 902 and another user interface 903, a memory 904, at least one communication bus 905, and an operating system 906. The communication bus 905 is configured to implement connection and communication between these components. The memory 904 may include a high speed RAM memory, and may further include a non-volatile memory, for example, at least one disk memory. The memory 904 may optionally include at least one storage apparatus located far from the processor 901. The operating system 906 includes various programs and is configured to implement various basic services and process a hardware-based task.

The network interface 902 is configured to receive an internal address request message sent by a user equipment in a first intranet of an enterprise.

The network interface 902 is configured to send the internal address request message to an operator service gateway, so that the operator service gateway allocates an internal IP address to the user equipment.

Further, the network interface 902 is further configured to: after sending the internal address request message to the operator service gateway, receive an internal address response message that includes the internal IP address and is sent by the operator service gateway.

Further, the network interface 902 is further configured to send the internal address response message to the user equipment.

The processor 901 is configured to: before sending the internal address request message to the operator service gateway, add a VLAN identifier to the internal address request message, where the VLAN identifier corresponds to the first intranet.

The processor 901 is further configured to delete the VLAN identifier included in the internal address response message.

The network interface 902 is specifically configured to send the internal address response message to the user equipment in the first intranet corresponding to the VLAN identifier.

For apart or all of the messages involved in this embodiment, generation of the messages may be implemented by the processor 901 of the operator access device, or another component/module, or the processor 901 combined with another component/module.

The memory 904 may store a readable computer instruction or computer program. Various operations executed by the at least one processor 901 may be implemented according to the computer instruction or the computer program.

The at least one processor 901 in the operator access device in this embodiment may further execute, according to the readable computer instruction or computer program stored in the memory 904, all operations or functions of the operator access device in the embodiment corresponding to any one of the accompany drawings FIG. 1 to FIG. 4.

The operator access device according to this embodiment may be used to execute a part that is executed by the operator access device in the technical solution of the method embodiment shown in FIG. 3 or FIG. 4. Implementation principles and technical effects thereof are similar, and details are not described herein again. FIG. 9 is merely a schematic diagram of a structure of the operator access device according to the present invention, and a specific structure may be adjusted according to an actual situation.

A network system according to an embodiment of the present invention includes any operator service gateway in the foregoing embodiments and any operator access device in the foregoing embodiments.

The following uses interworking between a branch network of enterprise A and a headquarters network of enterprise A as an example. The branch network of enterprise A may be the first intranet in the foregoing embodiments, and the headquarters network of enterprise A may be the second intranet in the foregoing embodiments. With reference to a schematic structural diagram of an embodiment of a network system and a flowchart of an IP packet processing method according to an embodiment of the present invention, a technical solution of this embodiment of the present invention is further described in detail.

Figure 10A:
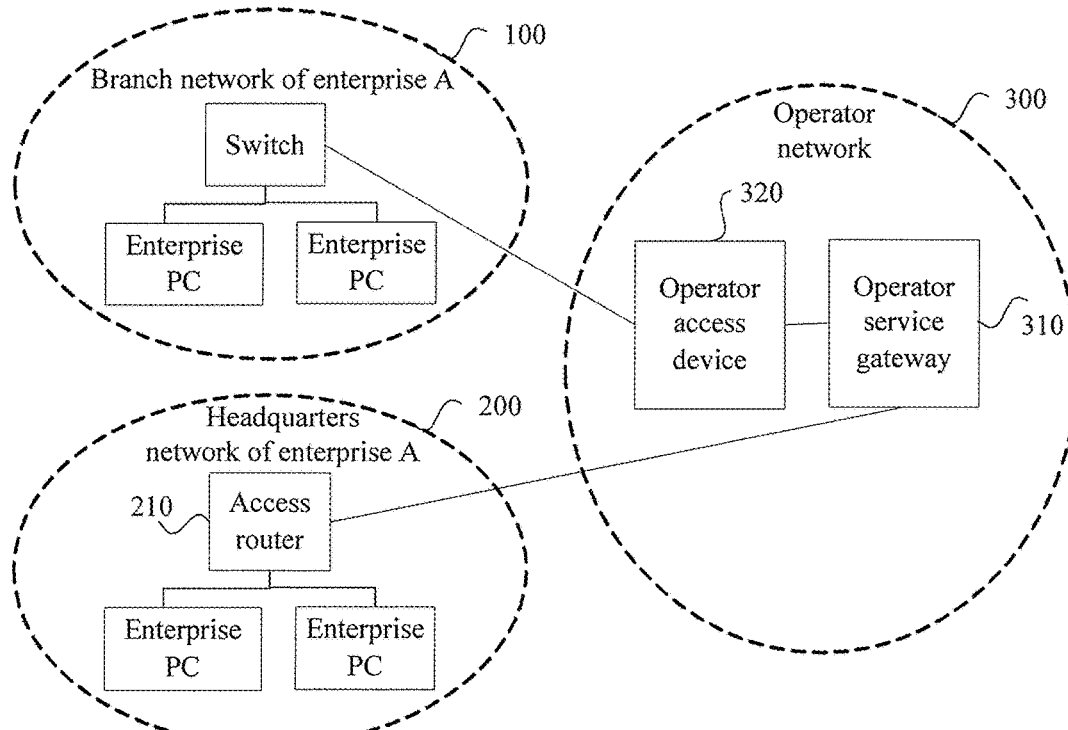
FIG. 10A is a schematic structural diagram of Embodiment 1 of a network system according to the present invention.

FIG. 10A is a schematic structural diagram of Embodiment 1 of a network system according to the present invention. The network system in this embodiment is an operator network 300. The operator network 300 may include an operator service gateway 310 and an operator access device 320. Enterprise A may include a branch network 100 of enterprise A and a headquarters network 200 of enterprise A. The branch network 100 of enterprise A only includes PCs and a switch that is used to connect the PCs and connect to a network. A PC may be a user equipment in the first intranet or the second intranet in the foregoing embodiments. In addition to the PCs and the switch that is used to connect to the PCs and connect to a network, the headquarters network 200 of enterprise A further includes an access router 210. A scenario that this embodiment aims at is a case in which the branch network 100 of enterprise A and the headquarters network 200 of enterprise A are located in a same area and access a same operator service gateway.

It can be understood that, in this embodiment, more branch networks of enterprise A may be further included in addition to the branch network 100 of enterprise A; and in addition to the branch network 100 of enterprise A and the headquarters network 200 of enterprise A, more enterprise networks may access an operator network, for example, networks of multiple other organizations and institutions, such as branch networks of enterprise B or a headquarters network of enterprise B. In this embodiment, the operator service gateway 310 and the operator access device 320 may simultaneously allocate IP addresses to the networks of the multiple organizations and institutions, and process, according to the allocated IP addresses, interactive service packets between the networks of the organizations and institutions. For example, the operator service gateway 310 and the operator access device 320 may distinguish the networks of the multiple organizations and institutions by using VLAN identifiers corresponding to the networks of the organizations and institutions.

Figure 10B:
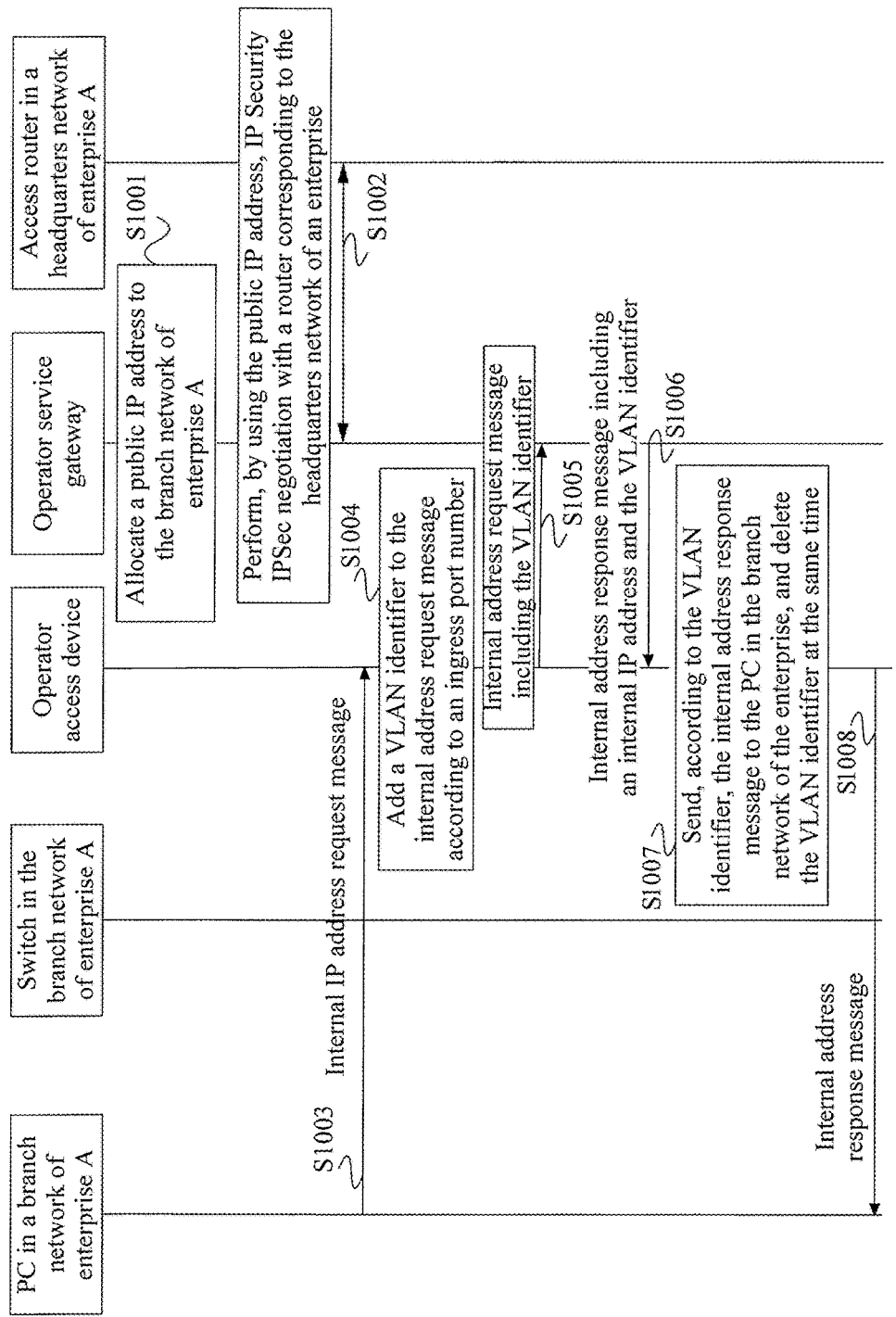
FIG. 10B is a flowchart of implementing, by the network system shown in FIG. 10A, an IP address allocation phase in an embodiment of an IP packet processing method according to the present invention.

FIG. 10B is a flowchart of implementing, by the network system shown in FIG. 10A, an IP address allocation phase in an embodiment of an IP packet processing method according to the present invention. As shown in FIG. 10B and FIG. 10A, the IP address allocation phase in the IP packet processing method according to this embodiment includes the following:

S1001: An operator service gateway allocates a public IP address to a branch network of enterprise A.

The public IP address allocated to the branch network of enterprise A by the operator service gateway may be a static or dynamic public IP address.

S1002: The operator service gateway performs, by using the public IP address, IP Security IPSec negotiation with a router corresponding to a headquarters network of enterprise A.

A public IP address of the foregoing router corresponding to the headquarters network of enterprise A is a fixed IP address.

An IPSec negotiation result may include information such as an authentication protocol required for transmitting information, and an encryption key required by a security mechanism.

S1003: A PC in the branch network of enterprise A sends an internal IP address request message to an operator access device.

S1004: The operator access device adds a VLAN identifier to the internal address request message according to an ingress port number, where the VLAN identifier corresponds to the branch network of enterprise A.

If the operator service gateway serves multiple enterprise intranets, the VLAN identifier corresponding to the branch network of enterprise A needs to be added.

S1005: The operator access device sends an internal address request message including the VLAN identifier to the operator service gateway.

S1006: The operator service gateway sends an internal address response message that includes an internal IP address to the operator access device, where the internal address response message further carries the VLAN identifier corresponding to the branch network of enterprise A.

S1007: The operator access device sends, according to the VLAN identifier, the internal address response message to the PC in the branch network of enterprise A, and deletes the VLAN identifier at the same time.

S1008: The PC in the branch network of enterprise A receives the internal address response message.

In this embodiment, by performing the foregoing steps, it is implemented that the operator service gateway allocates the public IP address to the branch network of enterprise A, and allocates, to the PC in the branch network of enterprise A, the internal IP address that corresponds to the public IP address.

Figure 10C:
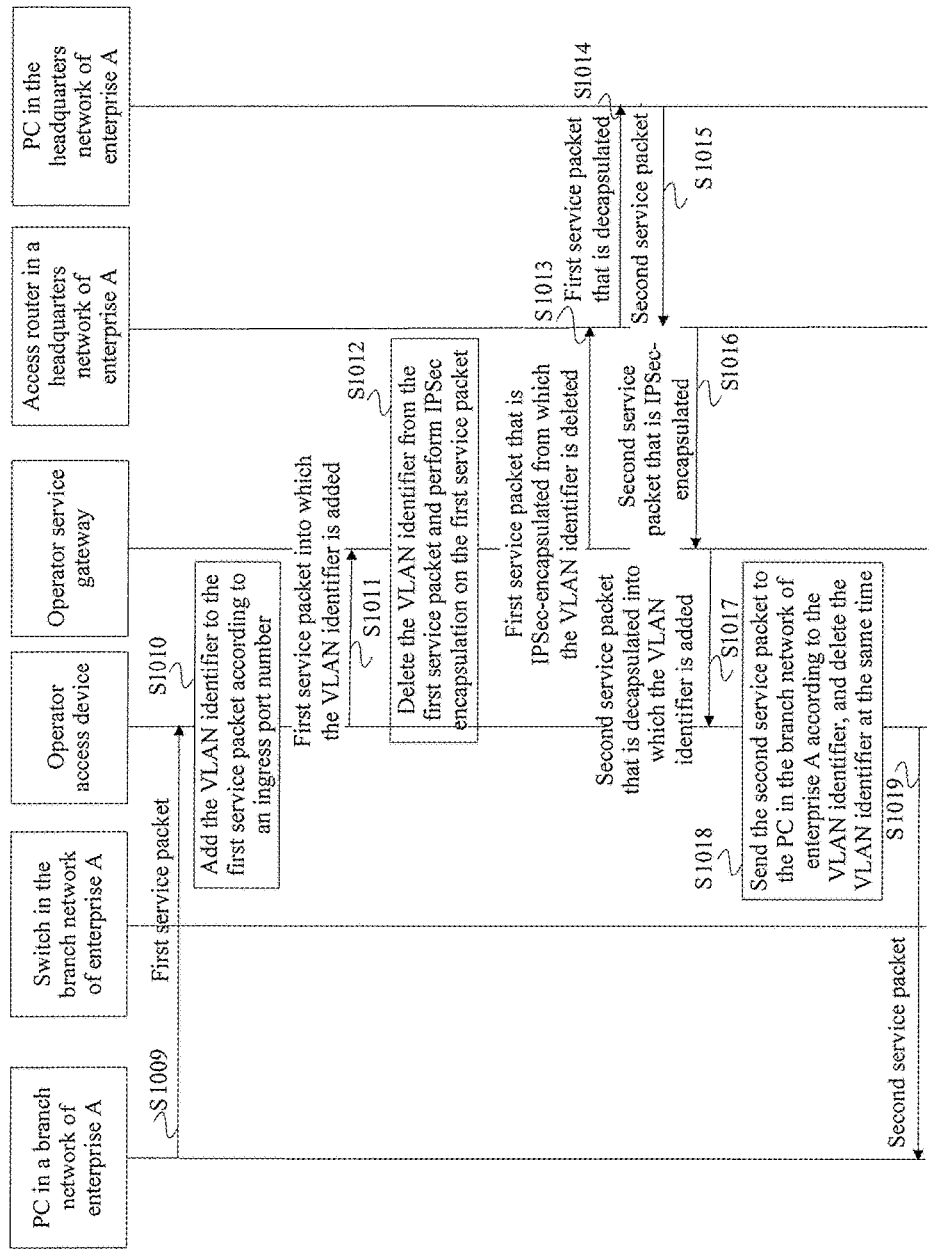
FIG. 10C is a flowchart of implementing, by the network system shown in FIG. 10A, a packet sending and receiving phase in the embodiment of the IP packet processing method according to the present invention.

Further, FIG. 10C is a flowchart of implementing, by the network system shown in FIG. 10A, a packet sending and receiving phase in the embodiment of the IP packet processing method according to the present invention. As shown in FIG. 10C and FIG. 10A, the packet sending and receiving phase of the IP packet processing method includes the following:

S1009: The PC in the branch network of enterprise A sends a first service packet to the operator access device.

The PC in the branch network of enterprise A generates, according to service information, the internal IP address, and an internal IP address of a user equipment in a peer-end second intranet, the first service packet.

S1010: The operator access device adds the VLAN identifier to the first service packet according to the ingress port number, where the VLAN identifier corresponds to a first intranet.

S1011: The operator access device sends a first service packet into which the VLAN identifier is added to the operator service gateway.

S1012: The operator service gateway deletes the VLAN identifier from the first service packet and performs IPSec encapsulation on the first service packet.

The first service packet that is IPSec-encapsulated further includes, in addition to service information, the public IP address of the branch network of enterprise A and a public IP address of the headquarters network of enterprise A.

S1013: The operator service gateway sends the first service packet that is IPSec-encapsulated from which the VLAN identifier is deleted to a router in the headquarters network of enterprise A.

S1014: After decapsulating the received first service packet, the router in the headquarters network of enterprise A sends a first service packet that is decapsulated to a PC in the headquarters network of enterprise A.

S1015: The PC in the headquarters network of enterprise A sends a second service packet to the router in the headquarters network of enterprise A.

The PC in the headquarters network of enterprise A generates the second service packet according to feedback service information of the first service packet, an internal IP address of the user equipment in the second intranet, and an internal IP address of a user equipment in the first intranet.

S1016: The router in the headquarters network of enterprise A performs IPSec encapsulation on the received second service packet, and sends the second service packet that is IPSec-encapsulated to the operator service gateway.

S1017: The operator service gateway performs decapsulation on the received second service packet, adds the VLAN identifier corresponding to the branch network of enterprise A and sends a second service packet that is decapsulated to the operator access device.

S1018: The operator access device sends, according to the VLAN identifier, the second service packet that is decapsulated to the PC in the branch network of enterprise A, and deletes the VLAN identifier at the same time.

S1019: The PC in the branch network of enterprise A receives the second service packet.

On a basis of the foregoing embodiment shown in FIG. 10A to FIG. 10C, it can be understood that the access router may not be disposed in the headquarters network 200 of enterprise A; and the operator service gateway 310 allocates a public IP address and an internal IP address to the headquarters network 200 of enterprise A and the PC in the headquarters network 200 of enterprise A, respectively, and processes, according to an IP address, an interactive service packet between the PC in the headquarters network 200 of enterprise A and the PC in the branch network 100 of enterprise A.

In this embodiment, an operator service gateway allocates a public IP address and a public internal IP address to a branch network of enterprise A and a user equipment in the branch network of enterprise A, respectively. The operator service gateway performs, according to the public IP address and the public internal IP address, IPSec encapsulation on a first service packet that is sent by the user equipment in the branch network of enterprise A; sends the first service packet that is IPSec-encapsulated through a public network to a router corresponding to a headquarters network of enterprise A; and then sends the second service packet that is IPSec-decapsulated to an operator access device, so that the operator access device sends the second service packet to the user equipment in the branch network of enterprise A; thereby reducing deployment complexity of an enterprise internal network, reducing difficulties and costs in management and maintenance of the enterprise internal network, and reducing investment costs for updating hardware devices in the enterprise internal network.

Figure 11A:
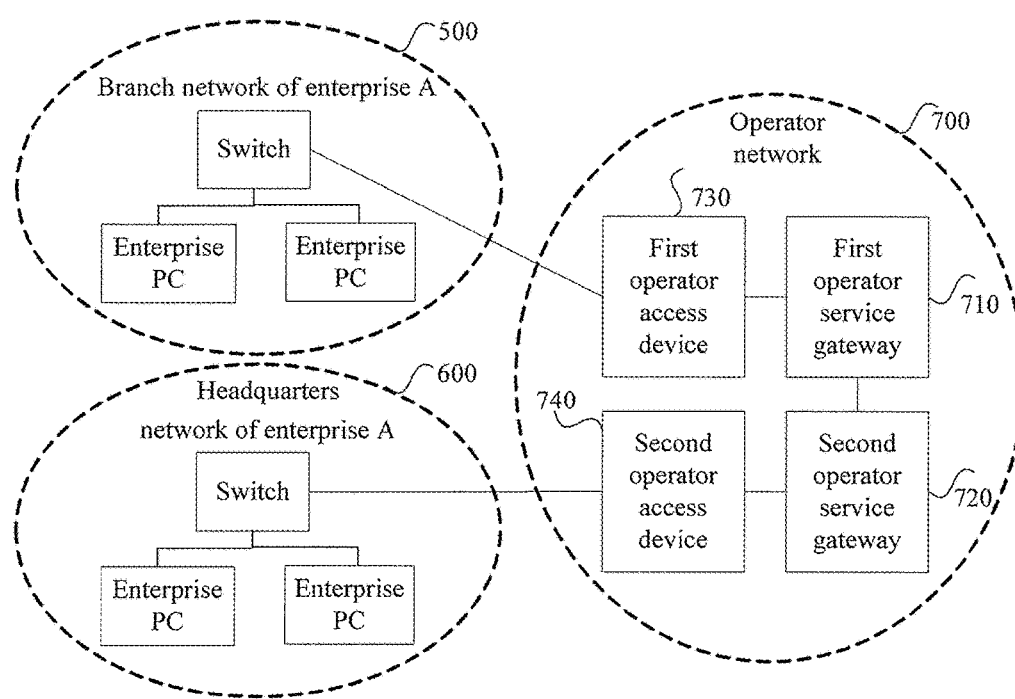
FIG. 11A is a schematic structural diagram of Embodiment 2 of a network system according to the present invention.

FIG. 11A is a schematic structural diagram of Embodiment 2 of a network system according to the present invention. The network system in this embodiment is an operator network 700, where the operator network 700 may include a first operator service gateway 710 that corresponds to a branch network 500 of enterprise A, a second operator service gateway 720 that corresponds to a headquarters network 600 of enterprise A, a first operator access device 730 that corresponds to the branch network 500 of enterprise A, and a second operator access device 740 that corresponds to the headquarters network 600 of enterprise A. The branch network 500 of enterprise A and the headquarters network 600 of enterprise A include only PCs and a switch that is used to connect the PCs and connect to a network, where a PC may be a user equipment in the first intranet or the second intranet in the foregoing embodiments. A scenario that this embodiment aims at is a case in which the branch network 500 of enterprise A and the headquarters network 600 of enterprise A are located in different areas and access different operator service gateways.

It can be understood that, in this embodiment, more branch networks of enterprise A may be further included in addition to the branch network 500 of enterprise A; and in addition to the branch network 500 of enterprise A and the headquarters network 600 of enterprise A, networks of multiple other organizations and institutions, such as branch networks of enterprise B or a headquarters network of enterprise B, may be further included. In this embodiment, the first operator service gateway 710 and the first operator access device 730, or the second operator service gateway 720 and the second operator access device 740 may simultaneously allocate IP addresses to the networks of the multiple organizations and institutions, and process, according to the allocated IP addresses, interactive service packets between the networks of the organizations and institutions. For example, an operator service gateway and an operator access device may distinguish the networks of the multiple organizations and institutions by using VLAN identifiers corresponding to the networks of the organizations and institutions.

Figure 11B:
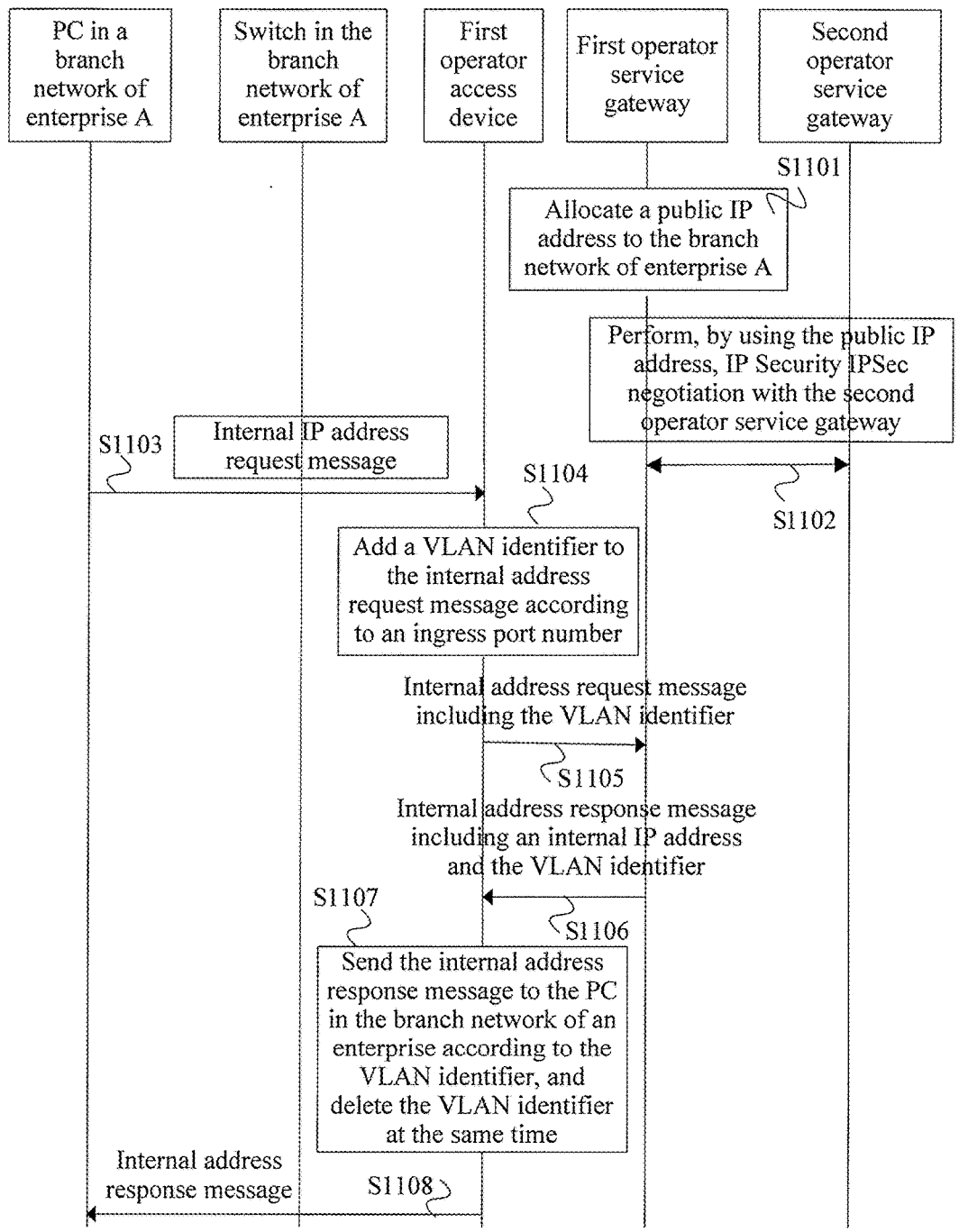
FIG. 11B is a flowchart of implementing, by the network system shown in FIG. 11A, an IP address allocation phase in an embodiment of an IP packet processing method according to the present invention.

FIG. 11B is a flowchart of implementing, by the network system shown in FIG. 11A, an IP address allocation phase in an embodiment of an IP packet processing method according to the present invention. As shown in FIG. 11B and FIG. 11A, the IP address allocation phase includes the following:

S1101: A first operator service gateway allocates a public IP address to a branch network of enterprise A.

S1102: The first operator service gateway performs, by using the public IP address, IP Security IPSec negotiation with a second operator service gateway.

Steps S1103 to S1108 in the IP address allocation phase of the IP packet processing method according to this embodiment are similar to steps S1003 to S1008 in FIG. 10B, and details are not described herein again.

Figures 1, 11C:
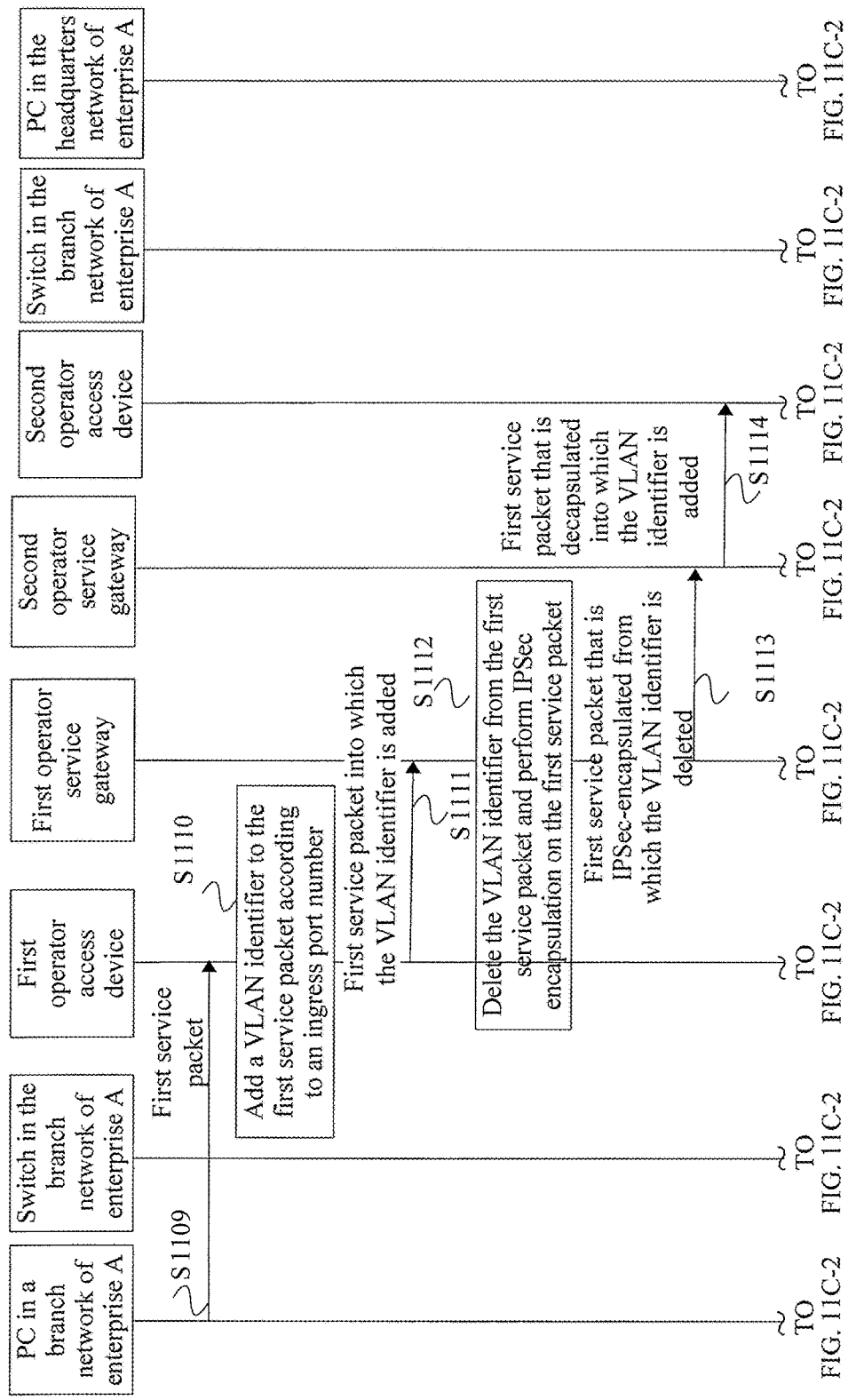
Figures 2, 11C:
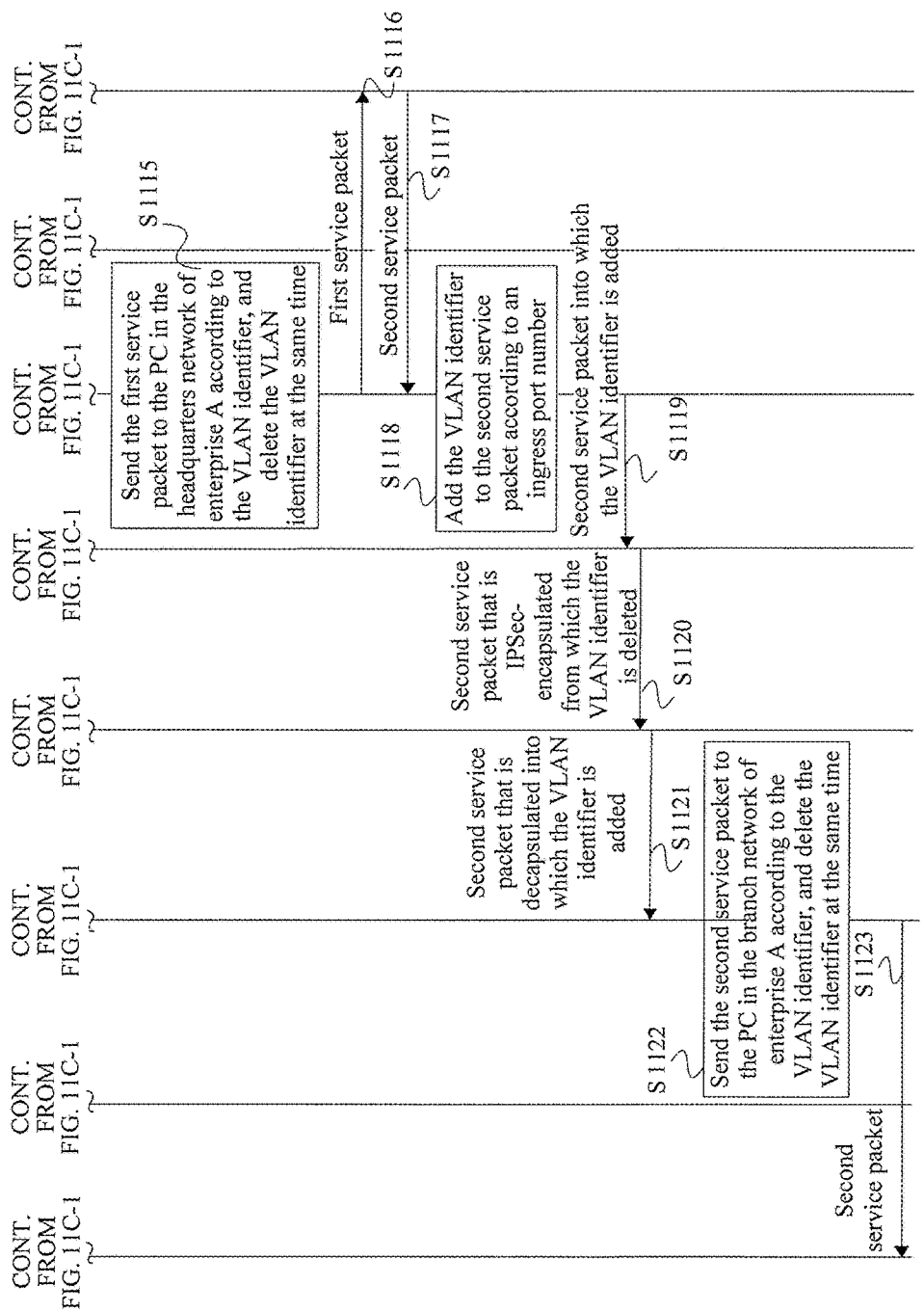

Further, FIG. 11C-1 and FIG. 11C-2 are a flowchart of implementing, by the network system shown in FIG. 11A, a packet sending and receiving phase in the embodiment of the IP packet processing method according to the present invention. As shown in FIG. 11C-1 and FIG. 11C-2 and FIG. 11A, steps S1109 to S1112 in the packet sending and receiving phase of the IP packet processing method according to this embodiment are similar to steps S1009 to S1012 in FIG. 10O, and details are not described herein again.

S1113: The first operator service gateway sends the first service packet that is IPSec-encapsulated to the second operator service gateway.

S1114: The second service operator gateway decapsulates the received first service packet, add a VLAN identifier to the first service packet, sends the first service packet to a second operator access device, where the added VLAN identifier is a VLAN identifier corresponding to a headquarters network of enterprise A.

S1115: The second operator access device sends, according to the VLAN identifier, the received first service packet to a PC in the headquarters network of enterprise A, and deletes the VLAN identifier at the same time.

S1116: The PC in the headquarters network of enterprise A receives the first service packet that is sent by the second operator access device.

S1117: The PC in the headquarters network of enterprise A sends a second service packet to the second operator access device.

The PC in the headquarters network of enterprise A generates the second service packet according to feedback service information of the first service packet, an internal IP address of the user equipment in the second intranet, and an internal IP address of a user equipment in the first intranet.

S1118: The second operator access device adds the VLAN identifier to the second service packet according to an ingress port number, where the VLAN identifier is the VLAN identifier corresponding to the headquarters network of enterprise A.

S1119: The second operator access device sends a second service packet into which the VLAN identifier is added to the second operator service gateway.

S1120: The second operator service gateway performs IPSec encapsulation on the received second service packet, and sends the second service packet that is IPSec-encapsulated to the first operator service gateway.

Steps S1121 to S1123 are similar to steps S1017 to S1019 in FIG. 10C, and details are not described herein again.

On a basis of the embodiment shown in foregoing FIG. 11A to FIG. 11C-1 and FIG. 11C-2, it can be understood that, an access router may be disposed in one of the branch network 500 of enterprise A and the headquarters network 500 of enterprise A. The access router allocates an internal IP address of a PC in a network of enterprise A in which the access router is disposed; and the access router processes, according to an IP address, an interactive service packet between a PC in the headquarters network 600 of enterprise A and a PC in the branch network 500 of enterprise A.

In this embodiment, a first operator service gateway allocates a public IP address and a public internal IP address to a branch network of enterprise A and a user equipment in the branch network of enterprise A, respectively. The first operator service gateway performs, according to the public IP address and the public internal IP address, IPSec encapsulation on a first service packet that is sent by the user equipment in the branch network of enterprise A; sends the first service packet that is IPSec-encapsulated through a public network to a second operator service gateway; and then sends the second service packet that is IPSec-decapsulated to an operator access device, so that the operator access device sends the second service packet to the user equipment in the branch network of enterprise A; thereby further reducing deployment complexity of an enterprise internal network, reducing difficulties and costs in management and maintenance of the enterprise internal network, and reducing investment costs for updating hardware devices in the enterprise internal network.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An internet protocol (IP) packet processing method, comprising:
    allocating, by an operator service gateway, a public IP address for a first intranet;
    performing, by the operator service gateway, an IP security (IPSec) negotiation, based on the public IP address, with a device corresponding to a second intranet;
    sending an internal address assigned for user equipment in the first intranet to the first intranet;
    receiving, by the operator service gateway, a first service packet comprising the internal IP address;
    performing, by the operator service gateway, IPSec encapsulation on the first service packet, wherein the first service packet that is IPSec-encapsulated comprises the public IP address; and
    sending, by the operator service gateway, the first service packet that is IPSec-encapsulated to the device corresponding to the second intranet.

2. The method according to claim 1, wherein after sending the first service packet that is IPSec-encapsulated to the device corresponding to the second intranet, the method further comprises:
    receiving, by the operator service gateway, a second service packet that comprises a public IP address of the second intranet;
    performing, by the operator service gateway, IPSec decapsulation on the second service packet; and sending, by the operator service gateway, the second service packet that is IPSec-decapsulated to the operator access device.

3. An operator service gateway, comprising:

a processor;

memory coupled to the processor, the memory comprising instructions that, when executed by the processor, cause the operator service gateway to:

allocate a public internet protocol (IP) address for a first intranet of an enterprise;

perform an IP security (IPSec) negotiation, based on the public IP address, with a device corresponding to a second intranet;

send an internal address assigned for user equipment in the first intranet to the first intranet;

receive a first service packet, wherein the first service packet comprises the internal IP address;

perform IPSec encapsulation on the first service packet, wherein the first service packet that is IPSec-encapsulated comprises the public IP address; and send the first service packet that is IPSec-encapsulated to the device corresponding to the second intranet or a router corresponding to the second intranet.

4. The operator service gateway according to claim 3, wherein the memory further comprises instructions that, when executed by the processor, cause the operator service gateway to:

after sending the first service packet that is IPSec-encapsulated to the device corresponding to the second intranet, receive a second service packet that comprises a public IP address of the second intranet;

perform IPSec decapsulation on the second service packet; and send the second service packet that is IPSec-decapsulated to the operator access device.

* * * * *